(12) United States Patent
Merritt et al.

(10) Patent No.: US 12,179,425 B2
(45) Date of Patent: Dec. 31, 2024

(54) METAL PLATED ADDITIVELY MANUFACTURED PLASTIC ROTOR SHROUDS AND THEIR METHOD OF MANUFACTURING

(71) Applicant: Hamilton Sundstrand Corporation, Charlotte, NC (US)

(72) Inventors: Brent J. Merritt, Southwick, MA (US); Viktor Kilchyk, Lancaster, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/104,514

(22) Filed: Feb. 1, 2023

(65) Prior Publication Data

US 2024/0253302 A1 Aug. 1, 2024

(51) Int. Cl.
*B29C 64/165* (2017.01)
*B29C 64/30* (2017.01)
(Continued)

(52) U.S. Cl.
CPC ............ *B29C 64/165* (2017.08); *B29C 64/30* (2017.08); *B33Y 40/20* (2020.01); *B33Y 70/10* (2020.01);
(Continued)

(58) Field of Classification Search
CPC ... G25D 5/56; B29K 2305/00; C23C 18/1641
See application file for complete search history.

(56) References Cited

U.S. PATENT DOCUMENTS 7,927,708 B2 * 4/2011 Mizrahi .................. B32B 27/36
428/626
9,427,835 B2 8/2016 Cheung et al.
(Continued)

FOREIGN PATENT DOCUMENTS

CA 2917967 A1 1/2015
CN 101600817 A 12/2009
(Continued)

OTHER PUBLICATIONS

English Translation of WO2009031632A1 (Year: 2009).*
(Continued)

*Primary Examiner* — Woody A Lee, Jr.
*Assistant Examiner* — Wesley Le Fisher
(74) *Attorney, Agent, or Firm* — Kinney & Lange, P.A.

(57) ABSTRACT

In one aspect, a rotor shroud for a rotary machine includes a disk portion extending along and oriented about a central axis of the rotary machine, a transition portion extending from the disk portion, and a flared portion extending axially from the transition portion. The disk portion, the transition portion, and the flared portion include a plastic substrate and metal plating disposed on at least apportion of an outer surface of the plastic substrate. The plastic substrate has a matrix material and fibers embedded in the matrix material. The fibers have a first coefficient of thermal expansion. The metal plating has a second coefficient of thermal expansion. The fibers are selected such that a bulk coefficient of thermal expansion of the plastic substrate at the outer surface of the plastic substrate substantially matches the second coefficient of thermal expansion of the metal plating.

20 Claims, 5 Drawing Sheets

(51) Int. Cl.
*B29K 305/00* (2006.01)
*B29L 31/00* (2006.01)
*B33Y 40/20* (2020.01)
*B33Y 70/10* (2020.01)
*B33Y 80/00* (2015.01)
*F01D 25/24* (2006.01)
*F04D 29/02* (2006.01)
*F04D 29/42* (2006.01)

(52) U.S. Cl.
CPC .............. *B33Y 80/00* (2014.12); *F01D 25/24* (2013.01); *F04D 29/023* (2013.01); *F04D 29/4226* (2013.01); *B29K 2305/00* (2013.01); *B29K 2995/0012* (2013.01); *B29L 2031/7504* (2013.01); *F05D 2220/323* (2013.01); *F05D 2230/31* (2013.01)

(56) References Cited

U.S. PATENT DOCUMENTS

| | | | |
|---|---|---|---|
| 9,777,593 | B2 | 10/2017 | Kirkpatrick et al. |
| 9,920,429 | B2 | 3/2018 | Carlsten et al. |
| 10,519,965 | B2 * | 12/2019 | Xie ................. F01D 21/045 |
| 10,655,470 | B2 | 5/2020 | Okabe et al. |
| 10,677,090 | B2 | 6/2020 | Sakala et al. |
| 10,927,843 | B2 * | 2/2021 | Roach .................. F04D 29/023 |
| 11,268,526 | B2 * | 3/2022 | Roach .................. B32B 27/281 |
| 11,802,488 | B2 | 10/2023 | Merritt et al. |
| 11,970,951 | B1 | 4/2024 | Kilchyk et al. |
| 2012/0148391 | A1 * | 6/2012 | Ibaraki ................ F04D 29/4206 415/200 |
| 2012/0263585 | A1 | 10/2012 | Matsuyama |
| 2013/0001321 | A1 | 1/2013 | Pelletier et al. |
| 2013/0121817 | A1 | 5/2013 | Boehm et al. |
| 2013/0154194 | A1 | 6/2013 | Van |
| 2013/0260130 | A1 | 10/2013 | Taxacher et al. |
| 2014/0248156 | A1 * | 9/2014 | Parkos, Jr. ............. F01D 25/005 156/60 |
| 2016/0160353 | A1 | 6/2016 | Miarecki et al. |
| 2016/0160869 | A1 | 6/2016 | Roach et al. |
| 2016/0167791 | A1 * | 6/2016 | Roach .................. B64D 15/00 428/458 |
| 2016/0169012 | A1 | 6/2016 | Dacunha et al. |
| 2019/0170254 | A1 | 6/2019 | Taslakian et al. |
| 2020/0018260 | A1 | 1/2020 | Garcia et al. |
| 2020/0157968 | A1 | 5/2020 | Braun et al. |
| 2021/0054852 | A1 | 2/2021 | Verma et al. |
| 2021/0323245 | A1 | 10/2021 | Lochner et al. |
| 2022/0145768 | A1 | 5/2022 | Angel et al. |
| 2023/0085189 | A1 | 3/2023 | Merritt et al. |
| 2023/0193047 | A1 | 6/2023 | Gettings et al. |
| 2023/0235672 | A1 | 7/2023 | Albers |
| 2024/0254888 | A1 | 8/2024 | Merritt et al. |
| 2024/0271727 | A1 | 8/2024 | Kilchyk et al. |

FOREIGN PATENT DOCUMENTS

| | | |
|---|---|---|
| CN | 102472115 B | 6/2015 |
| DE | 102004039473 A1 | 3/2006 |
| DE | 102007024130 A1 | 12/2008 |
| DE | 102007048852 B4 | 2/2016 |
| RU | 2611137 C1 | 2/2017 |
| WO | WO-2009031632 A1 * | 3/2009 ....... B29C 45/14311 |

OTHER PUBLICATIONS

"The Best of Both Worlds: A New Take on Metal-Plastic Hybrid 3D Printing", Waseda University, Oct. 5, 2020 [online], [retrieved on Feb. 27, 2023]. Retrieved from the Internet <URL: https://www.sciencedaily.com/releases/2020/10/201005101542.htm>.

A. Freier, "New 3D Printing Technique Allows for Better Control of Composite Material Fiber Orientation" Jan. 16, 2018 [online] [retrieved Feb. 27, 2023] <URL:https://all3dp.com/new-3d-printing-technique-allows-better-control-composite-material-fiber-orientation/>.

A. Pearson, et al., "Novel polyurethane elastomeric composites reinforced with alumina, aramid . . . " from Composite Part B: Engineering, vol. 122, Aug. 1, 2017, 6 pages <https://doi.org/10.1016/j.compositesb.2017.04.017>.

B. Coxworth. "Hybrid 3D printing tech produces plastic-metal items" New Atlas, Oct. 6, 2020 [online], [retrieved on Feb. 27, 2023]. Retrieved from the Internet <URL: https://newatlas.com/3d-printing/hybrid-3d-printing-plastic-metal-items/>.

G. Gardiner, "Magnetic 3D Printing the next generation of tailored composites", Jul. 26, 2019 [online], [retrieved on Feb. 27, 2023]. Retrieved from <URL:https://www.compositesworld.com/articles/magnetic-3d-printing-the-next-generation-of-tailored-composites>.

N. Giani, et al., "Towards sustainability in 3D printing of thermoplastic composites: Evaluation of recycled carbon fibers . . . ", from Composites Part A: Applied Sci & Mfg, vol. 159, Aug. 2022, 6 pages <https://doi.org/10.1016/j.compositesa.2022.107002>.

The Best of Both Worlds: A New Take on Metal-Plastic Hybrid 3D Printing, Waseda University, Oct. 5, 2020 [online], [retrieved on Feb. 27, 2023]. Retrieved from the Internet <URL: https://www.waseda.jp/top/en/news/73810>.

"Fiberglass Fabrics & Composites" JPS [online], Retrieved from the Internet <URL:https://jpscm.com/why-fiberglass/>, 2022, 5 pages.

"Plastic Thermal Expansion-Thermal Expansion of Engineering Thermoplastics" [online], Retrieved from the Internet <URL:https://www.azom.com/suppliers.aspx?SupplierID=1356>, 2020, 6 pages.

"Thermal Expansion of Metals", The Engineering Toolbox [online], Retrieved from Internet: URL:https://www.engineeringtoolbox.com/thermal-expansion-metals-d_859.html>, 2020, 7 pages.

Extended European Search Report for EP Application No. 24154670.4, dated Jul. 23, 2024, 7 pages.

Extended European Search Report for EP Application No. 24155028.4, dated Jul. 15, 2024, 5 pages.

Extended European Search Report for EP Application No. 24155287.6, dated Jul. 15, 2024, 5 pages.

Extended European Search Report for EP Application No. 24155310.6, dated Jul. 15, 2024, 6 pages.

Extended European Search Report for EP Application No. 24155387.4, dated Jul. 15, 2024, 6 pages.

* cited by examiner

METAL PLATED ADDITIVELY MANUFACTURED PLASTIC ROTOR SHROUDS AND THEIR METHOD OF MANUFACTURING

BACKGROUND

The present disclosure relates generally to aviation components and, more particularly, to metal-plated plastic rotor shrouds.

Metal-plated plastic aviation components have been developed as a lightweight, high-strength, alternative to metal components. Metal-plated plastic components include a plastic or plastic substrate coated with a metal plating on an outer surface. The metal plating increases the strength and abrasion resistance of the component. Metal-plated plastic components have been particularly attractive for use in gas turbine engine applications, where they can provide overall weight reduction of the engine to improve engine efficiency and provide fuel cost savings.

Limitations in use of metal-plated plastic components are generally due to poor adhesion between the metal plating and the plastic substrate, which reduces long-term component durability. Various methods of manufacture and mechanical locking features have been developed to improve an interfacial bond strength between the metal plating the plastic at variable temperatures, as separation of the metal plating can occur.

SUMMARY

In one aspect, a rotor shroud for a rotary machine includes a disk portion extending along and oriented about a central axis of the rotary machine, a transition portion extending from the disk portion, and a flared portion extending axially from the transition portion. The disk portion, the transition portion, and the flared portion include a plastic substrate and metal plating disposed on at least apportion of an outer surface of the plastic substrate. The plastic substrate has a matrix material and fibers embedded in the matrix material. The fibers have a first coefficient of thermal expansion. The metal plating has a second coefficient of thermal expansion. The fibers are selected such that a bulk coefficient of thermal expansion of the plastic substrate at the outer surface of the plastic substrate substantially matches the second coefficient of thermal expansion of the metal plating.

A method of forming a rotor shroud for a rotary machine includes forming, by an additive manufacturing process, a plastic substrate having an outer surface, impregnating, by the additive manufacturing process, the plastic substrate with fibers having a first coefficient of thermal expansion, and applying a metal plating to the outer surface of the plastic substrate. The metal plating has a second coefficient of thermal expansion and the fibers are selected such that a bulk coefficient of thermal expansion of the plastic substrate at the outer surface of the plastic substrate substantially matches the second coefficient of thermal expansion of the metal plating. The plastic substrate and the metal plating together form the rotor shroud having a disk portion extending along and oriented about a central axis of the rotary machine, a transition portion extending from the disk portion, and a flared portion extending axially from the transition portion.

The present summary is provided only by way of example, and not limitation. Other aspects of the present disclosure will be appreciated in view of the entirety of the present disclosure, including the entire text, claims and accompanying figures.

DETAILED DESCRIPTION

The present disclosure is directed to metal-plated additively manufactured plastic aviation rotating shaft components with controlled thermal expansion behavior to reduce component damage caused by operation in environments of varying temperature or temperature gradients.

Figure 1:
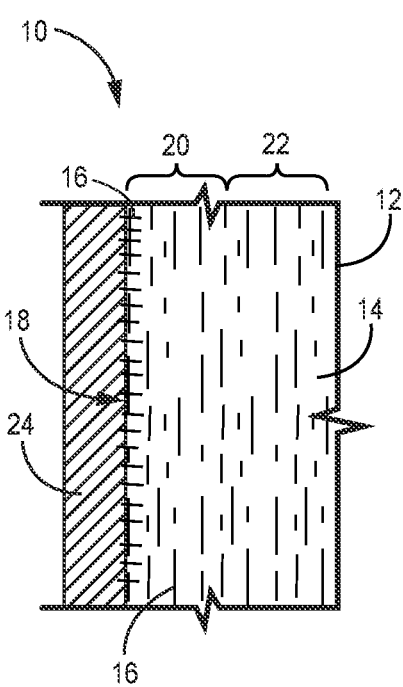
FIG. 1 is a simplified cross-sectional view of a portion of a metal-plated component.

FIG. 1 is a simplified cross-sectional view of a portion of a metal-plated plastic component. FIG. 1 shows component 10, substrate 12, matrix 14, fibers 16, outer surface 18, outer region 20, inner region 22, and metal plating 24. Component 10 can be a rotating shaft component of a turbomachine, including but not limited to a thrust shaft, a compressor and fan shaft, or a turbine shaft. Substrate 12 has outer surface 18, outer region 20, and inner region 22. Outer region 20 is adjacent to outer surface 18. Inner region 22 is separated from outer surface 18 by outer region 20. Substrate 12 includes matrix 14 and fibers 16. Fibers 16 are embedded in matrix 14. Metal plating 24 is disposed on outer surface 18 of substrate 12.

Substrate 12 includes matrix 14 and fibers 16. Matrix 14 is a plastic or polymer material. Matrix 14 can be a thermoplastic. Matrix 14 can include but is not limited to acrylonitrile butadiene styrene (ABS), polyetherimide (PEI), thermoplastic polyimide, polyether ether ketone (PEEK), polyether ketone ketone (PEKK), polysulfone, polyamide, polyphenylene sulfide, polyester, polyimide, and combinations thereof. Matrix 14 can define a shape of substate 12. Matrix 14 can be formed of a plurality of materials with individual materials selectively located in substrate 12 to provide desired material properties in different regions of component 10. In some embodiments, substrate 12 can include one or more voids or open sections or structures, such as a hollow core or openings formed between internal support structures.

Fibers 16 are embedded in matrix 14. Fibers 16 are selected and arranged to control a bulk coefficient of thermal expansion (CTE) of substrate 12. Fibers 16 are selected and arranged in substrate 12 to reduce a CTE mismatch between substrate 12 and metal plating 24. Substrate 12 with fibers 16 can be designed to have a bulk CTE substantially matching a CTE of metal plating 24 to prevent separation of metal plating 24 from outer surface 18 during operation of component 10 in varying temperatures. Fibers 16 can be selected and arranged to meet additional functional requirements of component 10 including stress reduction, deflection management, and containment as described further herein.

Matrix 14 can be formed of a material having a CTE greater than the CTE of metal plating 24. Fibers 16 can be formed of material having a lower CTE than the CTE of matrix 14 to lower the bulk CTE of substrate 12. Fibers 16 constrain thermal expansion of substrate 12. Fibers 16 can include but are not limited to carbon, metal, para-aramid (e.g., Kevlar® and Twaron®), glass, and combinations thereof. In some embodiments, fibers 16 can be formed of the same material as metal plating 24. In some embodiments, subsets of fibers 16 can be formed of different materials. Regions of substrate 12 can include fibers 16 formed of the same material or different materials. The combinations of materials forming matrix 14 and fibers 16 can vary throughout a component to provide desired material properties.

Fibers 16 can be continuous fibers, discontinuous fibers, or combinations thereof. Fibers 16 can have a filament diameter and length selected to minimize cracking of substrate 12 caused by separation at fiber-matrix interfaces. A concentration and arrangement of fibers 16 can be selected to provide substrate 12 with a bulk CTE substantially matching the CTE of metal plating 24. As shown in FIG. 1, fibers 16 can be substantially uniformly distributed throughout matrix 14 to provide an entirety of substrate 12 with a bulk CTE substantially matching the CTE of metal plating 24. As discussed further herein, in some embodiments, fiber placement can be tailored to control a bulk CTE of one or more regions of substrate 12.

Fibers 16 can be disposed to extend parallel to outer surface 18 and metal plating 24 and/or perpendicular or otherwise angled relative to metal plating 24. Fibers 16 extending perpendicular to otherwise angled relative to metal plating 24 can extend through outer surface 18. Fibers 16 protruding through outer surface 18 can improve a bond between metal plating 24 and substrate 12. In some embodiments, a subset of fibers 16 can be disposed on or at outer surface 18. For example, fibers 16 can form a portion of outer surface 18 with individual fibers 16 separated by matrix 14. Fibers 16 disposed at outer surface 18 or protruding through outer surface 18 can be formed of a material capable of forming a high-strength bond with metal plating 24. Fibers 16 disposed at outer surface 18 or protruding through outer surface 18 can thereby improve a bond between metal plating 24 and substrate 12. For example, fibers 16 disposed at outer surface 18 or protruding through outer surface 18 can be formed of metal. In some embodiments, fibers 16 and metal plating 24 can be the same material. In some embodiments, a subset of fibers 16 formed of metal can be provided to improve bonding of metal plating 24, while bulk CTE of substrate 12 can be controlled primarily by a subset of fibers 16 formed of another material (e.g., carbon, para-aramid, or glass).

Selection of fiber 16 material, geometry, orientation relative to metal plating 24 or outer surface 18, and concentration can be made to provide substate 12 with an expansion rate in outer region 20 in a plane parallel to metal plating 24 not exceeding the expansion rate of metal plating 24, while also improving a bond between substrate 12 and metal plating 24. While it is particularly important to control CTE mismatch between substrate 12 and metal plating 24 at the interface and an adjacent region to prevent separation of metal plating 24, it may not be necessary that all regions of substrate 12 have the same CTE as discussed further herein. In some embodiments, the composition of both fibers 16 and matrix 14 can vary from one region to another. The combination of materials can be selected to provide a desired bulk CTE and other material properties optimized for the operation of component 10. Metal plating 24 is disposed on outer surface 18. Metal plating can include but is not limited to chromium-nickel alloys or alloys containing at least one of nickel, cobalt, copper, iron, palladium, chromium, and cadmium. Metal plating 24 can be selected based on the operational environment of component 10 and performance requirements of component 10, including but not limited to operating temperatures, vibrational impacts, environmental contaminants, impact requirements, etc. Metal plating can have a thickness selected to achieve a desired strength of component 10 while minimizing the amount of weight metal plating 24 adds to substrate 12. Metal plating can have a thickness, for example, in a range of about 0.001 inches (0.0254 mm) to about 0.050 inches (1.27 mm). It may be desirable to provide metal plating 24 with a thickness outside of these ranges for some applications. Metal plating can be disposed directly on outer surface 18 of substrate 12. Metal plating 24 can cover all or portions of outer surface 18.

Figure 2:
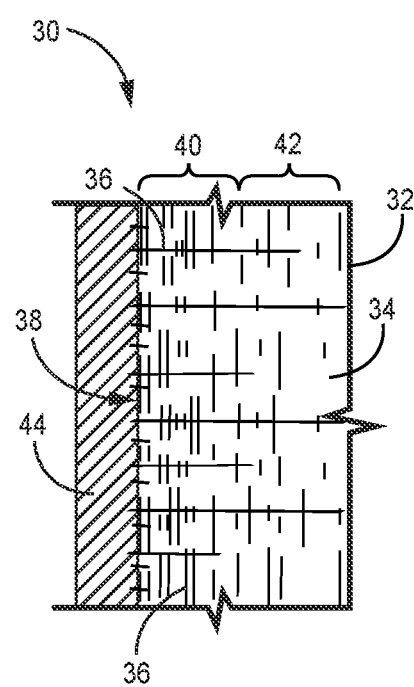
FIG. 2 is a simplified cross-sectional view of a portion of another embodiment of a metal-plated component.

FIG. 2 is a simplified cross-sectional view of a portion of another embodiment of a metal-plated plastic component. FIG. 2 shows component 30, substrate 32, matrix 34, fibers 36, outer surface 38, outer region 40, inner region 42, and metal plating 44. Component 30 can be substantially similar to component 10 with the exception of the placement of fibers 36. Matrix 34 and metal plating 44 can be substantially the same as matrix 14 and metal plating 24 of component 10 shown in FIG. 1 and described with respect thereto. As described further herein, portions of matrix 34 can be provided with or without fibers 36. For example, some regions of substrate 32 can be formed of matrix 34 without fibers 36.

Fibers 36 are embedded in matrix 34. Fibers 36 are selected and arranged to control a bulk coefficient of thermal expansion (CTE) of substrate 32, particularly in outer region 40 and outer surface 38. Fibers 36 are selected and arranged in substrate 32 to reduce a CTE mismatch between substrate 32 and metal plating 44. Substrate 32 with fibers 36 can be designed to have a bulk CTE, particularly in outer region 40 and at outer surface 38, substantially matching a CTE of metal plating 44 to prevent separation of metal plating 44 from outer surface 38 during operation of component 30 in varying temperatures. As further described herein, fibers 36 can be selected and arranged to meet additional functional requirements of component 30 including stress reduction, deflection management, and containment as described further herein.

Fibers 36 can be arranged in a concentration gradient extending from inner region 42 to outer surface 38 with inner region 42 having a lower concentration of fibers 36 than outer region 40. Inner region 42 can be defined as a region internal to component 30 and/or separated from outer surface 38. Outer region 40 is disposed between inner region 42 and outer surface 38 and extending to outer surface 38. In some embodiments, all or a portion of inner region 42 can be free of fibers 36. The arrangement of fibers 36 in this manner (i.e., concentration gradient) can produce a variation in CTE of substrate 12 from inner region 42 through outer region 40, however, the variation in CTE can be tailored to minimize an impact at outer surface 38 or the bond between metal plating 44 and substrate 32.

Fibers 36 can include but are not limited to carbon, metal, para-aramid (e.g., Kevlar® and Twaron®), glass, and combinations thereof. In some embodiments, fibers 36 can be formed of the same material as metal plating 44. In some embodiments, subsets of fibers 36 can be formed of different materials. Regions of substrate 32 can include fibers 36 formed of the same material or different materials. The combinations of materials forming matrix 14 and fiber 16 can vary throughout a component to provide desired material properties.

Fibers 36 can be continuous fibers, discontinuous fibers, or combinations thereof. Fibers 36 can have a filament diameter and length selected to minimize cracking of substrate 32 caused by separation at fiber-matrix interfaces. A concentration and arrangement of fibers 36 across inner region 42 and/or outer region 40 can be selected to provide substrate 32 with a bulk CTE at and adjacent to outer surface 38 substantially matching the CTE of metal plating 44. As shown in FIG. 2, fibers 36 can be provided in greatest concentration adjacent to outer surface 38.

As described with respect to FIG. 1, fibers 36 can be disposed to extend parallel and/or perpendicular or otherwise angled relative to outer surface 38 and metal plating 44. Fibers 36 extending perpendicular to otherwise angled relative to metal plating 44 can extend through outer surface 38. Fibers 36 protruding through outer surface 38 can improve a bond between metal plating 44 and substrate 32. In some embodiments, fibers 36 can be disposed on or at outer surface 38. For example, fibers 36 can form a portion of outer surface 38 with individual fibers 36 separated by matrix 34. Fibers 36 disposed at outer surface 38 or protruding through outer surface 38 can be formed of a material capable of forming a high-strength bond with metal plating 44. Fibers 36 disposed at outer surface 38 or protruding through outer surface 38 can thereby improve a bond between metal plating 44 and substrate 32. For example, fibers 36 disposed at outer surface 38 or protruding through outer surface 38 can be formed of metal. In some embodiments, fibers 36 and metal plating 44 can be the same material. A subset of fibers 36 formed of metal can be provided to improve bonding of metal plating 44, while bulk CTE of substrate 32 can be controlled primarily by a subset of fibers 36 formed of another material (e.g., carbon, para-aramid, or glass).

Selection of fiber 36 material, geometry, orientation relative to metal plating 44 or outer surface 38, and concentration can be made to provide substate 32 with an expansion rate in outer region 40 in a plane parallel to metal plating 44 not exceeding the expansion rate of metal plating 44, while also improving a bond between substrate 32 and metal plating 44.

Figure 3:
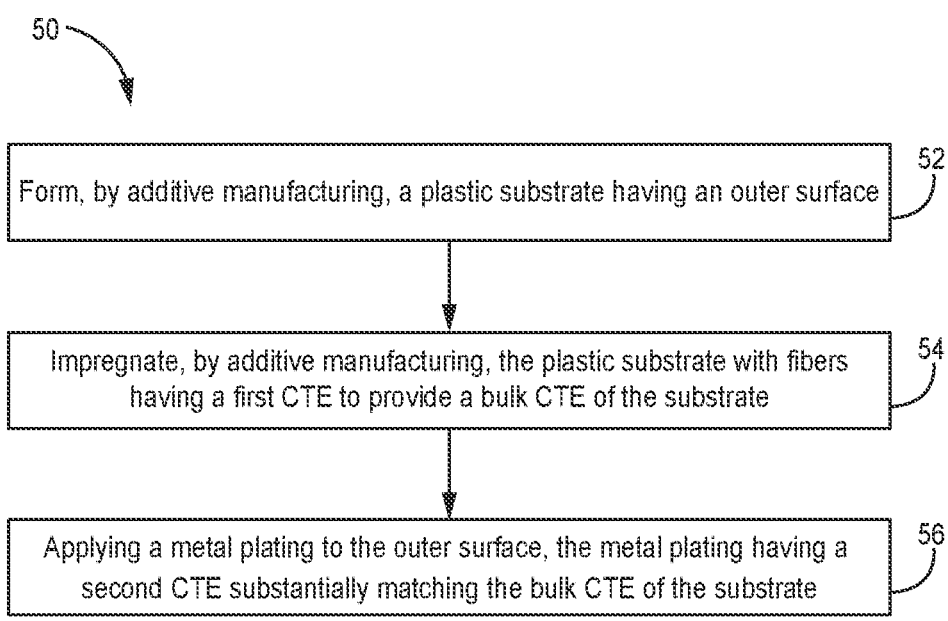
FIG. 3 is a flowchart of a method for forming a metal-plated component.

FIG. 3 is a flowchart of a method forming a metal-plated component according to the present disclosure. FIG. 3 shows method 50. Step 52 includes forming, by an additive manufacturing process, a plastic substrate (e.g., substrate 12 or 32) having an outer surface. The substrate can be formed by 3D plastic printing by depositing a matrix material, such as matrix materials 14 and 34 shown in FIGS. 1 and 2 and described with respect thereto.

Step 54 includes impregnating, by the additive manufacturing process, the substrate with fibers. Fibers can be fibers 16 and 36 shown in FIGS. 1 and 2 and described with respect thereto. As previously described, the fibers can be selected and arranged to provide desired material properties. Fibers can be co-extruded with the matrix material to form the substrate with fibers embedded in the matrix. The addition of fibers to the matrix material produces a substrate with a bulk CTE less than a CTE of the matrix material.

In some embodiments, fibers can be arranged in concentration and/or material gradients as previously described. Fiber arrangement can be controlled by the 3D printing process. In some embodiments, a dual nozzle can be used to extrude materials of different fiber compositions and/or fiber concentrations and selectively print the different material in different regions of the substrate. For example, step 54 can include selectively printing the fibers in a concentration gradient extending from an inner region of the plastic substrate to the outer surface of the plastic substrate, such that the concentration of fibers increases from the inner region toward the outer surface of the plastic substrate. In other embodiments, step 54 can include selectively printing the fibers in a region adjacent to the outer surface of the plastic substrate and/or at an angle relative to the outer surface and/or such that fibers protrude through the outer surface of the plastic substrate to improve bonding with a metal plating applied on the outer surface. In some embodiments, step 54 can include selectively printing the plastic substrate without the fibers (e.g., matrix material only) in an inner region of the plastic substrate.

Step 56 includes applying a metal plating to the outer surface of the substrate. Metal plating can be metal plating 24 and 44 shown in FIGS. 1 and 2 and described with respect thereto. The metal plating can be selectively applied to one or more locations on the outer surface (e.g., locations susceptible to damage by abrasion, etc.). The metal plating has a CTE substantially matching the bulk CTE of the substrate or bulk CTE of the substrate in a region adjacent to the outer surface of the substrate in the location metal plating is to be applied. The metal plating can be applied, for example by electroless plating. In some examples, a printer with a dual nozzle can be used to selectively print a catalyst material layer on all or portions of an outer surface of the substrate. For example, one nozzle can extrude the substrate material (matrix and fiber) and one nozzle can extrude the matrix material loaded with a catalyst. The metal plating can then be formed on the outer surface loaded with the catalyst through a process of electroless plating.

Figure 4:
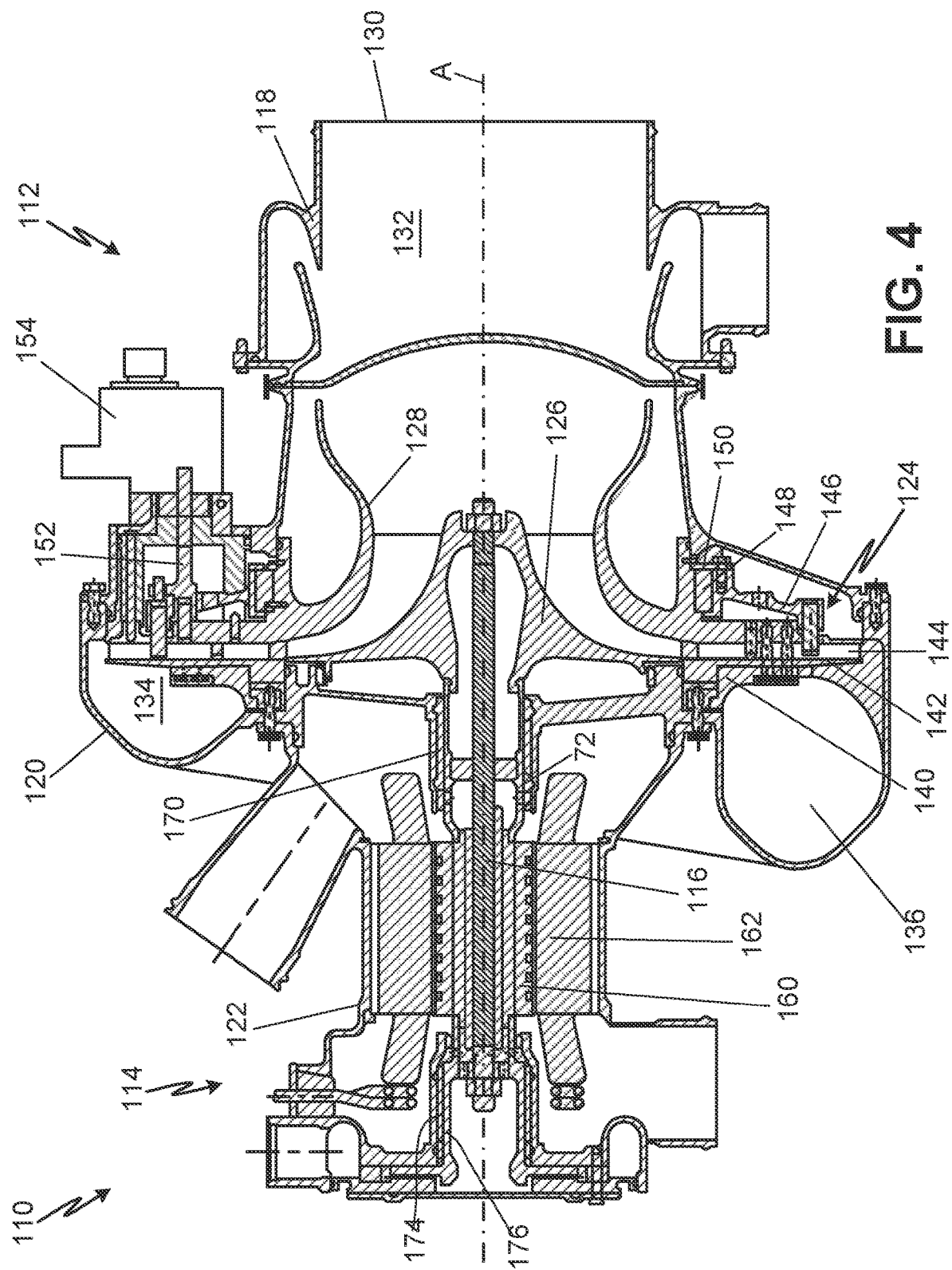
FIG. 4 is a cross-sectional view of a turbomachine.

FIG. 4 is a cross-sectional view of turbomachine 110, which can be a cabin air compressor. Alternatively, turbomachine 110 could be an air cycle machine or other rotary machine. Turbomachine 110 includes compressor section 112, motor section 114, tie rod 116, compressor inlet housing 118, compressor outlet housing 120, motor housing 122, variable diffuser 124, rotor 126, and rotor shroud 128. Compressor inlet housing 118 includes inlet 130 and inlet duct 132. Compressor outlet housing 120 includes outlet duct 134 and outlet 136. Variable diffuser 116 includes backing plate 140, inboard plate 142, diffuser vanes 144, drive ring 146, drive ring bearing 148, backup ring 150, pinion 152, and variable diffuser actuator 154. Motor section 114 includes motor rotor 160 and motor stator 162. Turbomachine 110 further includes first journal bearing 170, first rotating shaft 172, second journal bearing 174, and second rotating shaft 176. FIG. 4 also shows axis A.

Turbomachine 110 includes compressor section 112 and motor section 114 mounted on tie rod 116. Tie rod 116 is configured to rotate about axis A. Compressor section 112 includes compressor inlet housing 118 and compressor outlet housing 120 that are connected to one another. Motor section 114 includes motor housing 122, which is connected to compressor outlet housing 120. Variable diffuser 124 is positioned between compressor inlet housing 118 and compressor outlet housing 120. Rotor 126 is positioned between compressor inlet housing 118 and compressor outlet housing 120. Rotor 126 is mounted on tie rod 116, which rotatably connects rotor 126 and motor section 114. Rotor shroud 128 is positioned radially outward from and partially surrounds compressor rotor 126.

Compressor inlet housing 118 includes inlet 130 and inlet duct 132. Inlet 130 is positioned at a first end of compressor inlet housing 118. Inlet duct 132 extends from inlet 130 through compressor inlet housing 118 to rotor 126. Compressor outlet housing 120 includes outlet duct 134 and outlet 136. Outlet duct 134 extends through compressor outlet housing 120 from rotor 126 to outlet 136.

Variable diffuser 116 includes backing plate 140, inboard plate 142, diffuser vanes 144, drive ring 146, drive ring bearing 148, pinion 150, backup ring 152, and variable diffuser actuator 154. Backing plate 140 abuts compressor outlet housing 120 on a first side and inboard plate 142 on a second side. Inboard plate 142 abuts backing plate 140 on a first side and diffuser vanes 144 on a second side. Diffuser vanes 144 abut inboard plate 142 on a first side and rotor shroud 128 on a second side. Diffuser vanes 144 are configured to direct the compressed air from rotor 126 into outlet duct 134. Drive ring 146 is positioned radially outward from rotor shroud 128, and drive ring bearing 148 is positioned between driver ring 146 and rotor shroud 128. Drive ring 146 abuts rotor shroud 128 on a first side and backup ring 150 on a second side. Backup ring 150 is positioned radially outward of rotor shroud 128. Pinion 152 is connected to variable diffuser actuator 154 and is coupled to drive ring 146. Pinion 152 permits control of variable diffuser 116. Drive ring 146 is coupled to diffuser vanes 144 with pins, and as drive ring 146 is rotated it will drag diffuser vanes 144 and cause them to rotate.

Motor section 114 includes motor housing 122, motor rotor 160, and motor stator 162. Motor housing 122 encases motor rotor 160 and motor stator 162. Motor rotor 160 is disposed within motor stator 162 and is configured to rotate about axis A. Motor rotor 160 is mounted to tie rod 116 to drive rotation of tie rod 116.

Motor rotor 160 of motor section 114 drives rotation of tie rod 116, first rotating shaft 172 and second rotating shaft 176 in turbomachine 110. Tie rod 116 and first rotating shaft 172 in turn rotate rotor 126. The rotation of rotor 126 draws air into inlet 130 of compressor inlet housing 118. The air flows through inlet duct 132 to rotor 126 and will be compressed by rotor 126. The compressed air is then routed through variable diffuser 116 and into outlet duct 134 of compressor outlet housing 120. The air then exits turbomachine 110 through outlet 136 of compressor outlet housing 120 and can be routed to another component of an environmental control system, such as an air cycle machine.

Turbomachine 110 further includes first journal bearing 170, first rotating shaft 172, second journal bearing 174, and second rotating shaft 176. First journal bearing 170 is positioned in compressor section 112 and is supported by compressor outlet housing 120. First rotating shaft 172 extends between and rotates with rotor 126 and motor rotor 160. Motor rotor 160 drives rotation of rotor 126 with first rotating shaft 172. A radially outer surface of first rotating shaft 172 abuts a radially inner surface of first journal bearing 170. Second journal bearing 174 is positioned in motor section 114 and is supported by motor housing 122. Second rotating shaft 176 extends from and rotates with motor rotor 160. A radially outer surface of second rotating shaft 176 abuts a radially inner surface of second journal bearing 174.

Figure 5:
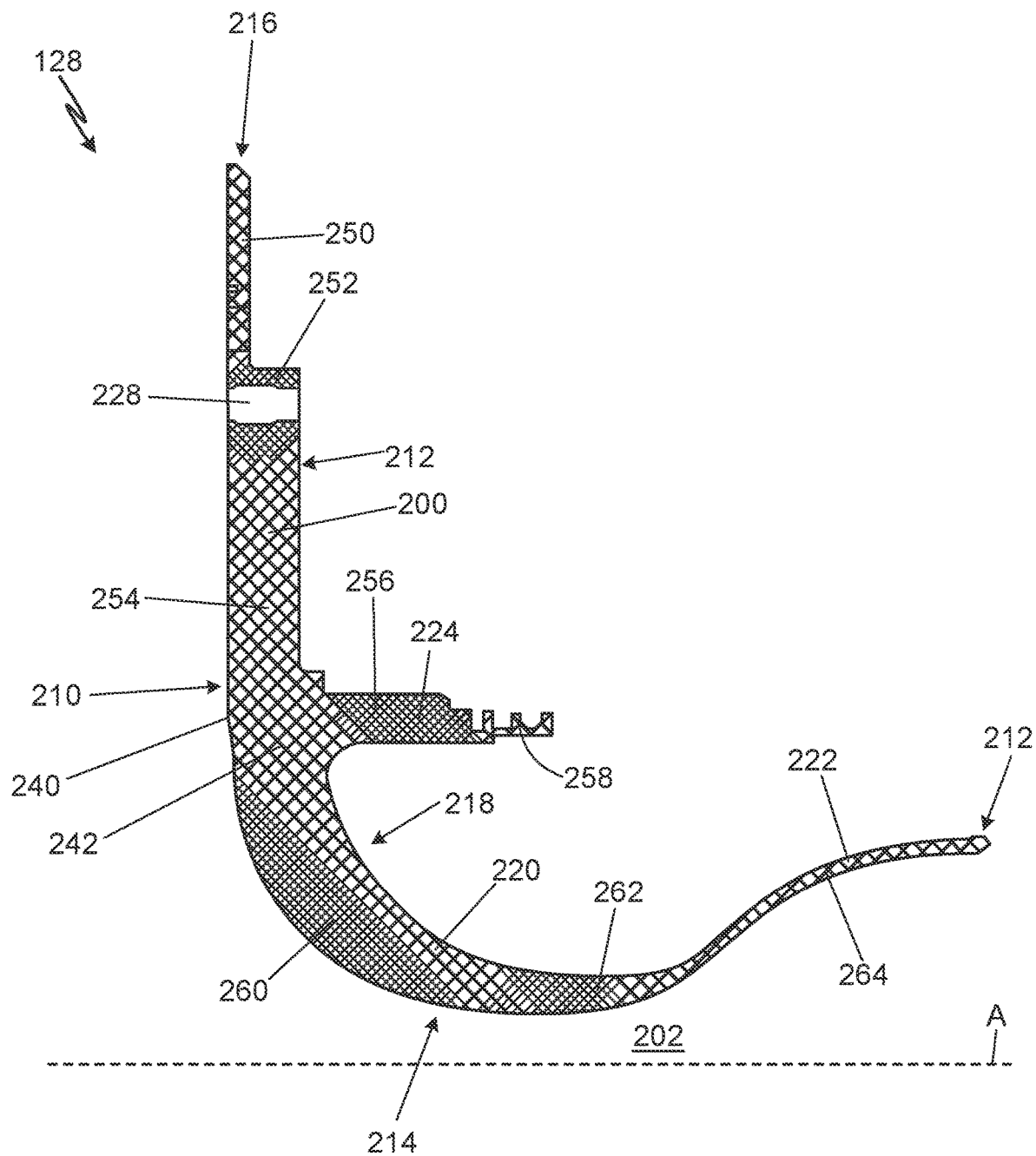
FIG. 5 is a cross-sectional view of a rotor shroud used in the turbomachine of FIG. 4.

FIG. 5 is a cross-sectional view of rotor shroud 128 of turbomachine 110. Rotor shroud 128 includes body 200 and bore 202. Body 200 includes first side 210, second side 212, radially inner end 214, radially outer end 216, disk portion 218, transition portion 220, flared portion 222, flange 224, and bolt holes 228. As shown in FIG. 3, body 200 further includes outer surface 240, and fiber-reinforced plastic structure 242, which includes first region 250, second region 252, third region 254, fourth region 256, fifth region 258, sixth region 260, seventh region 262, and eighth region 264.

Rotor shroud 128 includes body 200 with bore 202 extending through a center of body 200. Body 200 has first side 210 and second side 212 opposite of first side 210. In FIG. 5, first side 210 is on a left side and second side 212 is on a right side. Body 200 also has radially inner end 214 and radially outer end 216 opposite of radially inner end 214. Radially inner end 214 of body 200 defines bore 202 extending through body 200 of rotor shroud 128.

Body 200 includes disk portion 218 extending from radially outer end 216 to transition portion 220. Disk portion 218 is a generally flat and radially oriented portion of body 200. Transition portion 220 extends from disk portion 218 to flared portion 222. Transition portion 220 is curved with a first side connected to disk portion and a second side located radially inward towards radially inner end 214 and axially towards second side 212. Transition portion 220 has a generally frustoconical shape with a wider portion at the first side that tapers to a narrower portion at the second side. Flared portion 222 extends from transition portion 220 axially away from disk portion 218. Flared portion 222 flares radially outward moving axially away from transition portion 220. Flared portion 222 is slightly thicker at second end 212 than where flared portion 222 attaches to transition portion 220.

Flange 224 extends from a radially inner end of disk portion 218 on second side 212. Flange 224 extends axially away from disk portion 218 towards flared portion 222. Flange 224 includes grooves that are configured to receive O-rings to seal against other components of turbomachine 110 (as discussed in relation to FIG. 6). Bolt holes 228 include a plurality of holes positioned around disk portion 218. Bolt holes 228 extend through disk portion 218 from first side 210 to second side 212.

Body 200 further includes outer surface 240 and fiber-reinforced plastic structure 242. Outer surface 240 is a solid, continuous surface that surrounds fiber-reinforced plastic structure 242 in an interior of body 200. Outer surface 240 can include metal plating (for example, metal plating 24 shown in FIG. 1 or metal plating 44 shown in FIG. 2). The metal plating can be positioned on the entirety of or portions of outer surface 240 to help increase strength and reduce degradation of rotor shroud 128 from abrasives moving through turbomachine 110 (shown in FIG. 4).

Fiber-reinforced plastic structure 242 can include a matrix (for example, matrix 14 and matrix 34) and a fiber (for example, fiber 16 and fiber 36). Fiber material and arrangement (e.g., orientation and density) can be selected as previously described to control the bulk CTE of fiber-reinforced plastic structure 242 and, particularly a CTE of fiber-reinforced plastic structure 242 in locations of rotor shroud 128 adjacent to locations where metal plating is provided on outer surface 240 to improve a bond between fiber-reinforced plastic structure 242 and metal plating. Additionally, fiber density can be increased in regions subject to deflection, increased stress during operation of turbomachine 110, or for containing energy during a failure of other components of turbomachine 110 (for example, rotor 126, shown in FIG. 4).

Fiber density in fiber-reinforced plastic structure 242 can vary between regions of rotor shroud 128. The embodiment of FIG. 5 includes first region 250, second region 252, third region 254, fourth region 256, fifth region 258, sixth region 260, seventh region 262, and eighth region 264. First region 250 is a region of fiber-reinforced plastic structure 242 in disk portion 218 adjacent radially outer end 216. Second region 252 is a region of fiber-reinforced plastic structure 242 in disk portion 218 surrounding bolt holes 228. Third region 254 is a region of fiber-reinforced plastic structure 242 in disk portion 218 radially inward of bolt holes 228 and extending through transition portion 220. Fourth region 256 is a region of fiber-reinforced plastic structure 242 in flange 224 extending from disk portion 218. Fifth region 258 is a region of fiber-reinforced plastic structure 242 in flange 224 at a second side of flange 224. Sixth region 260 is a region of fiber-reinforced plastic structure 242 in transition portion 220 adjacent radially inner end 214 and first side 210 of body 200. Seventh region 262 is a region of fiber-reinforced plastic structure 242 in transition portion 220 adjacent radially inner end 214 and near flared portion 222. Eighth region 264 is a region of fiber-reinforced plastic structure 242 extending from transition portion 220 and through flared portion 222. Fiber content in fiber-reinforced plastic structure 242 may vary gradually or abruptly between regions. In the embodiment shown in FIG. 5, second region 252, fourth region 256, sixth region 260, and seventh region 262 have a greater density than first region 250, third region 254, fifth region 258, and eighth region 264.

Rotor shroud 128 is a metal-plated plastic component formed according to the present disclosure and including a fiber-reinforced matrix (also referred to as fiber-reinforced plastic structure 242) as disclosed in FIGS. 1 and 2 and variations thereof. Fibers can be selected and arranged to control thermal expansion of the plastic component relative to the metal plating and a bulk thermal expansion coefficient of rotor shroud 128 to manage deflection of rotor shroud 128 during operation of turbomachine 110. The metal plating on outer surface 240 can be disposed on one or more portions of rotor shroud 128. In some embodiments, application of the metal plating can be limited to regions susceptible to damage from stress, deflection during operation, or needed for energy absorption (or containment) to reduce the weight of rotor shroud 128.

Traditional rotor shrouds for rotary machines have solid cross-sections and are manufactured by casting and/or subtractive manufacturing processes, such as hogout. Additively manufacturing (for example, 3D printing) rotor shroud 128 allows fiber-reinforced plastic structure 242 to be used in rotor shroud 128. Using fiber-reinforced plastic structure 242 in rotor shroud 128 allows rotor shroud 128 to have a reduced weight compared to traditional rotor shrouds. At the same time, rotor shroud 128 will have an equivalent strength as traditional rotor shrouds due to the increased strength of fiber-reinforced plastic structure 242.

Figure 6:
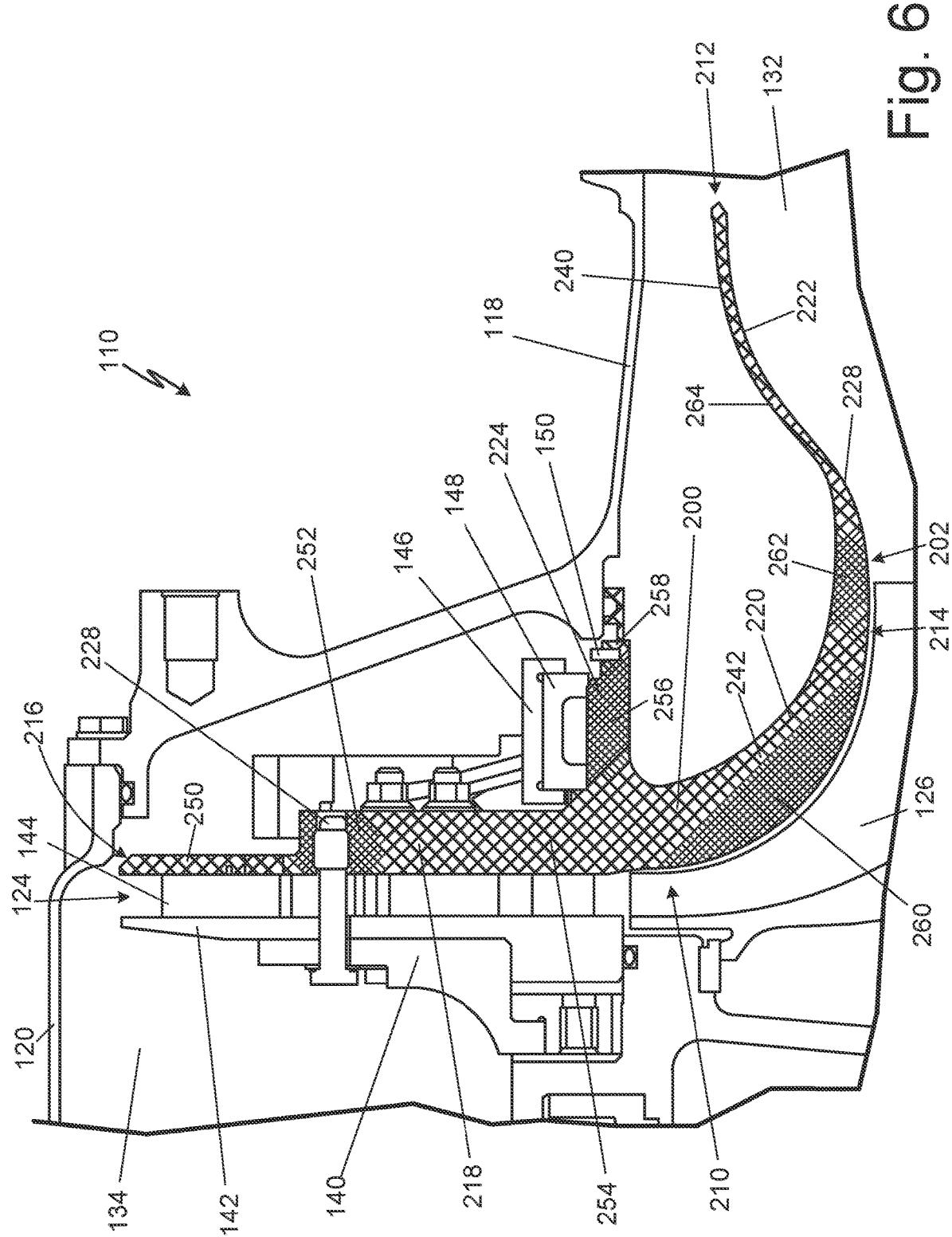
FIG. 6 is a cross-sectional view of the rotor shroud positioned in the turbomachine of FIG. 4.

FIG. 6 is a cross-sectional view of rotor shroud 128 positioned in turbomachine 110. FIG. 6 shows compressor inlet housing 118, compressor outlet housing 120, motor housing 122, variable diffuser 124, rotor 126, and rotor shroud 128. Compressor inlet housing 118 includes inlet duct 132. Compressor outlet housing 120 includes outlet duct 134. Variable diffuser 124 includes backing plate 140, inboard plate 142, diffuser vanes 144, drive ring 146, drive ring bearing 148, and backup ring 150. Rotor shroud 128 includes body 200 and bore 202. Body 200 includes first side 210, second side 212, radially inner end 214, radially outer end 216, disk portion 218, transition portion 220, flared portion 222, flange 224, and bolt holes 228. Body 200 further includes outer surface 240 and fiber-reinforced plastic structure 242, which includes first region 250, second region 252, third region 254, fourth region 256, fifth region 258, sixth region 260, seventh region 262, and eighth region 264.

Turbomachine 110 has the structure and design as described above in reference to FIG. 4. Rotor shroud 128 has the structure and design as described above in reference to FIG. 5. Rotor shroud 128 is positioned radially outward from rotor 126 and partially surrounds rotor 126. First side 210 of disk portion 218 of rotor shroud 128 is positioned adjacent to diffuser vanes 144. Second side 212 of disk portion 218 of rotor shroud 128 is positioned adjacent to drive ring 146. Bolts extend through backing plate 140, inboard plate 142, diffuser vanes 144, and bolt holes 228 of rotor shroud 128 to connect backing plate 140, inboard plate 142, diffuser vanes 144, and rotor shroud 128. Bolts extend through drive ring 146 into rotor shroud 128 to connect rotor shroud 128 to drive ring 146. Transition portion 220 of rotor shroud 128 is adjacent to and curves along blades of rotor 126. Flared portion 222 of rotor shroud 128 extends into inlet duct 132 of compressor inlet housing 118. Flange 224 of rotor shroud 128 has a radially outer surface that abuts drive ring bearing 148. Flange 224 also has grooves to receive O-ring seals that are positioned against compressor inlet housing 118.

Rotor shroud 128 has fourth region 256 of fiber-reinforced plastic structure 242 in flange 224. Fourth region 256 is a deflection region of rotor shroud 128, which is a region of rotor shroud 128 that is subject to deflection. As drive ring 146 rotates against drive ring bearing 148, fourth region 256 of flange 224 is subject to deflection. Fourth region 256 of fiber-reinforced plastic structure 242 is an area of increased fiber density that aids in deflection management of rotor shroud 128 to reduce and prevent deflection of rotor shroud 128, increasing the efficiency of turbomachine 110.

Rotor shroud 128 has seventh region 262 of fiber-reinforced plastic structure 242 in transition portion 220 adjacent radially inner end 214 and near flared portion 222. Seventh region 262 is a deflection region of rotor shroud 128, which is a region of transition portion 220 of rotor shroud 128 that is subject to deflection. As rotor 126 rotates, seventh region 262 of transition portion 220 of rotor shroud 128 can be subject to deflection. Seventh region 262 of fiber-reinforced plastic structure 242 is an area of increased fiber density that aids in deflection management of rotor shroud 128 to reduce and prevent deflection of rotor shroud 128, increasing the efficiency of turbomachine 110.

Turbomachine 110 includes clearances between moving components (for example, rotor 146) and non-moving components (for example, rotor shroud 128). Clearance reduces contact between moving and non-moving components and resultant damage and/or failure of turbomachine 110. Clearances account for deflections of both moving and non-moving components during operation of turbomachine 110. More deflection and strain in components means larger clearances and reduced efficiency in turbomachine 110 caused by air leaks through the clearances. Reducing deflection by identifying deflection regions (for example, fourth region 256 and seventh region 262 of rotor shroud 128) means clearances can be reduced, thereby increasing efficiency of turbomachine 110. Reducing deflection can be accomplished by increasing stiffness (by increased density of fiber in fiber-reinforced plastic structure 242 or adding metal plating to outer surface 240) in a region.

Rotor shroud 128 has second region 252 of fiber-reinforced plastic structure 242 in disk portion 218 surrounding bolt holes 228. Second region 252 is a stress region of rotor shroud 128, which is a region of rotor shroud 128 that is subject to and adapted to withstand high stress during operation of rotor shroud 128. The high stress in stress regions of rotor shroud 128, such as second region 252, is a higher stress than stresses present in other regions of rotor shroud 128. During operation of variable diffuser 124, second region 252 will be subject to and adapted to withstand stress that transfers into disk portion 218 of rotor shroud 128 from the bolts extending through bolt holes 228. Second region 252 of fiber-reinforced plastic structure 242 is an area of increased fiber density that aids in stress reduction during operation of turbomachine 110 to reduce the stress in second region 252 of rotor shroud 128. Stress reduction at critical points of rotor shroud 128 leads to increased longevity of rotor shroud 128.

Fourth region 256 is also a stress region of rotor shroud 128, which is a region of rotor shroud 128 that is subject to adapted to withstand high stress during operation of rotor shroud 128. The high stress in stress regions of rotor shroud 128, such as fourth region 256, is a higher stress than stresses present in other regions of rotor shroud 128. As drive ring 146 rotates against drive ring bearing 148, fourth region 256 of flange 224 is subject to adapted to withstand stress. Fourth region 256 of fiber-reinforced plastic structure 242 is an area of increased fiber density that aids in stress reduction during operation of turbomachine 110 to reduce the stress in fourth region 256 of rotor shroud 128. Stress reduction at critical points of rotor shroud 128 leads to increased longevity of rotor shroud 128.

Reducing stress in stress regions of rotor shroud 128 improves the longevity of rotor shroud 128. Reducing the stresses at stress regions can reduce the failure rate of rotor shroud 128 as well as the failure rate of turbomachine 110 overall. During operation, these failures can damage components surrounding rotor shroud 128 and decrease aircraft and passenger safety. Reduced failure rates result in reduced repairs, down time, and operating costs.

Rotor shroud 128 has sixth region 260 of fiber-reinforced plastic structure 242 in transition portion 220 adjacent radially inner end 214 and first side 210 of body 200. Sixth region 260 is an energy containment region of rotor shroud 128, which is a region of rotor shroud 128 that is designed to absorb energy from failed components of turbomachine 110. Sixth region 260 of transition portion 220 is positioned adjacent to blades on rotor 126 and needs to be designed to absorb energy from rotor 126 in the event of a failure of rotor 126. Sixth region 260 of fiber-reinforced plastic structure 242 is an area of increased fiber density that aids in energy containment during operation of turbomachine 110. Energy containment at critical points of rotor shroud 128 ensures safe operation of turbomachine 110.

Increased energy containment is important to the safe operation of turbomachine 110. If rotor 126 fails, rotor shroud 128 is positioned close to rotor 126 and designed to absorb the energy from a failed rotor 126 to protect other components of turbomachine 110, portions of aircraft utilizing turbomachine 110, and passengers on the aircraft from damage.

Rotor shroud 128 is one example of a rotor shroud in which variable fiber-reinforced plastic structure 242 can be used. In alternate embodiments, variable fiber-reinforced plastic structure 242 can be used in any suitable rotor shroud, for example a rotor shroud for a turbine rotor, having any design. Further, turbomachine 110 is one example of a turbomachinery or rotary machine in which rotor shroud 128 or any other rotor shroud with variable fiber-reinforced plastic structure 242 can be used. In alternate embodiments, rotor shroud 128 or any other rotor shroud with variable fiber-reinforced plastic structure 242 can be used in an air cycle machine or any other rotary machine.

The disclosed metal-plated plastic rotor shroud components with controlled thermal expansion behavior have an increased durability in environments of varying temperature or temperature gradients. Additional benefits of the disclosed metal-plated components include reduced weight, reduced costs, and faster design, manufacturing, and testing time. Additionally, plastic parts are not prone to static electric charging.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

DISCUSSION OF POSSIBLE EMBODIMENTS

In one aspect, a rotor shroud for a rotary machine includes a disk portion extending along and oriented about a central axis of the rotary machine, a transition portion extending from the disk portion, and a flared portion extending axially from the transition portion. The disk portion, the transition portion, and the flared portion include a plastic substrate and metal plating disposed on at least apportion of an outer surface of the plastic substrate. The plastic substrate has a matrix material and fibers embedded in the matrix material. The fibers have a first coefficient of thermal expansion. The metal plating has a second coefficient of thermal expansion. A bulk coefficient of thermal expansion of the plastic substrate at the outer surface of the plastic substrate substantially matches the second coefficient of thermal expansion of the metal plating.

The following are non-exclusive descriptions of possible embodiments of the present invention.

The rotor shroud of the preceding paragraph can optionally include, additionally and/or alternatively, any one or more of the following features, configurations and/or additional components:

In an embodiment of the rotor shroud of the preceding paragraph, the fibers are selected such that at least one of a fiber material, a fiber density, or a fiber orientation is selected so the bulk coefficient of thermal expansion of the plastic substrate at the outer surface of the plastic substrate substantially matches the second coefficient of thermal expansion of the metal plating.

In an embodiment of the rotor shroud of the preceding paragraph the matrix material can have a third coefficient of thermal expansion, the third coefficient of thermal expansion greater than the first coefficient of thermal expansion of the fibers.

In an embodiment of the rotor shroud of any of the preceding paragraphs, the first coefficient of thermal expansion of the fibers can be less than the second coefficient of thermal expansion of the metal plating.

In an embodiment of the rotor shroud of any of the preceding paragraphs, the fibers can be selected from the group consisting of carbon, para-aramid, glass, metal, and combinations thereof.

In an embodiment of the rotor shroud of any of the preceding paragraphs, the metal plating and the fibers can be the same material.

In an embodiment of the rotor shroud of any of the preceding paragraphs, a fiber density of the fibers embedded in the matrix material varies within the substrate.

In an embodiment of the rotor shroud of any of the preceding paragraphs, the fiber density gradually transitions between the first region having a reduced fiber density and the one or more second regions having an increased fiber density.

In an embodiment of the rotor shroud of any of the preceding paragraphs, the fiber density abruptly transitions between the first region having a reduced fiber density and the one or more second regions having an increased fiber density.

In an embodiment of the rotor shroud of any of the preceding paragraphs, the regions of varying fiber density can include a first region having a reduced fiber density and one or more second regions having an increased fiber density. The one or more second regions can be a deflection region or a stress region of the rotor shroud. The deflection region is subject to deflections during operation of the rotary machine and the stress region subject to and adapted to withstand higher stress than other regions of the rotor shroud during operation of the rotary machine. The energy containment region is configured to contain energy of failed components of the rotary machine.

In an embodiment of the rotor shroud of any of the preceding paragraphs, the stress region and the deflection region are a flange extending axially outward from the disk portion of the rotor shroud.

In an embodiment of the rotor shroud of any of the preceding paragraphs, the flange extends axially toward the flared portion.

In an embodiment of the rotor shroud of any of the preceding paragraphs, the stress region is a region surrounding a plurality of bolt holes through a radially outer portion of the disk region of the rotor shroud.

In an embodiment of the rotor shroud of any of the preceding paragraphs, the stress is a region of the transition portion adjacent to the flared portion of the rotor shroud.

In an embodiment of the rotor shroud of any of the preceding paragraphs, wherein the energy containment region is a region of the transition portion adjacent a first side and a radially inner end of the rotor shroud.

In an embodiment of the rotor shroud of any of the preceding paragraphs, the energy containment region is a curved region of the transition portion.

In an embodiment of the rotor shroud of any of the preceding paragraphs, an outer region disposed adjacent to the metal coating has an increased fiber density.

In an embodiment of the rotor shroud of any of the preceding paragraphs, the fibers of the outer region protrude through the outer surface of the plastic substrate.

In an embodiment of the rotor shroud of any of the preceding paragraphs, fibers of the plurality of fibers can be angled with respect to the outer surface in the outer region.

A method of forming a rotor shroud for a rotary machine includes forming, by an additive manufacturing process, a plastic substrate having an outer surface, impregnating, by the additive manufacturing process, the plastic substrate with fibers having a first coefficient of thermal expansion, and applying a metal plating to the outer surface of the plastic substrate. The metal plating has a second coefficient of thermal expansion and the fibers are selected such that a bulk coefficient of thermal expansion of the plastic substrate at the outer surface of the plastic substrate substantially matches the second coefficient of thermal expansion of the metal plating. The plastic substrate and the metal plating together form the rotor shroud having a disk portion extending along and oriented about a central axis of the rotary machine, a transition portion extending from the disk portion, and a flared portion extending axially from the transition portion.

The method of the preceding paragraph can optionally include, additionally and/or alternatively, any one or more of the following features, configurations, additional components, and/or steps:

In an embodiment of the method of any of the preceding paragraphs, the step of impregnating can include selectively printing the fibers to vary a fiber density in the plastic substrate.

In an embodiment of the method of any of the preceding paragraphs, to form a region of increased fiber density adjacent to the portion of the outer surface of the plastic substrate to which the metal plating is applied.

In an embodiment of the method of any of the preceding paragraphs, the step of impregnating can include selectively printing fibers at an angle relative to the portion of the outer surface to which the metal plating is applied.

In an embodiment of the method of any of the preceding paragraphs, the plastic of the plastic substrate can have a third coefficient of thermal expansion, the third coefficient of thermal expansion greater than the first coefficient of thermal expansion of the fibers.

In an embodiment of the method of any of the preceding paragraphs, the first coefficient of thermal expansion of the fibers can be less than the second coefficient of thermal expansion of the metal plating.

In an embodiment of the method of any of the preceding paragraphs, the fibers can be selected from the group consisting of carbon, para-aramid, glass, metal, and combinations thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A rotor shroud for a rotary machine comprising:
 a disk portion extending along and oriented about a central axis of the rotary machine;
 a transition portion extending from the disk portion; and
 a flared portion extending axially from the transition portion, the disk portion, the transition portion, and the flared portion together comprising:
  a plastic substrate, the plastic substrate comprising:
   a matrix material; and
   fibers embedded in the matrix material, the fibers having a first coefficient of thermal expansion; and a metal plating disposed on at least a portion of an outer surface of the plastic substrate, the metal plating having a second coefficient of thermal expansion, wherein the fibers are selected such that a bulk coefficient of thermal expansion of the plastic substrate at the outer surface of the plastic substrate matches the second coefficient of thermal expansion of the metal plating.

2. The rotor shroud of claim 1, wherein the matrix material has a third coefficient of thermal expansion, the third coefficient of thermal expansion greater than the first coefficient of thermal expansion of the fibers.

3. The rotor shroud of claim 2, wherein the first coefficient of thermal expansion of the fibers is less than the second coefficient of thermal expansion of the metal plating.

4. The rotor shroud of claim 1, wherein the fibers are selected from the group consisting of carbon, para-aramid, glass, metal, and combinations thereof.

5. The rotor shroud of claim 4, wherein the metal plating and the fibers are the same material.

6. The rotor shroud of claim 1, wherein a fiber density of the fibers embedded in the matrix material varies within the plastic substrate.

7. The rotor shroud of claim 6, wherein the plastic substrate comprises:
a first region having a reduced fiber density; and
one or more second regions having an increased fiber density,
wherein the one or more second regions is a deflection region, a stress region, and/or an energy containment region of the rotor shroud, the deflection region subject to deflections during operation of the rotary machine, the stress region adapted to withstand higher stress than other regions of the rotor during operation of the rotary machine, and the energy containment region configured to contain energy of failed components of the rotary machine.

8. The rotor shroud of claim 7, wherein the stress region and the deflection region are a flange extending axially outward from the disk portion of the rotor shroud.

9. The rotor shroud of claim 7, wherein the stress region is a region surrounding a plurality of bolt holes through a radially outer portion of the disk portion of the rotor shroud, and/or wherein the stress is a region of the transition portion adjacent to the flared portion of the rotor shroud.

10. The rotor shroud of claim 7, wherein the energy containment region is a region of the transition portion adjacent a first side and a radially inner end of the rotor shroud.

11. The rotor shroud of claim 6, wherein an outer region disposed adjacent to the metal coating has an increased fiber density.

12. The rotor shroud of claim 11, wherein the fibers of the outer region protrude through the outer surface of the plastic substrate.

13. The rotor shroud of claim 11, wherein fibers of the outer region are angled with respect to the outer surface of the plastic substrate.

14. A method of forming a rotor shroud for a turbomachine, the method comprising:
forming, by an additive manufacturing process, a plastic substrate having an outer surface;
impregnating, by the additive manufacturing process, the plastic substrate with fibers having a first coefficient of thermal expansion; and
applying a metal plating to at least a portion of the outer surface of the plastic substrate, the metal plating having a second coefficient of thermal expansion;
wherein the fibers are selected such that a bulk coefficient of thermal expansion of the plastic substrate at the outer surface of the plastic substrate matches the second coefficient of thermal expansion of the metal plating,
wherein the plastic substrate and the metal plating together form the rotor shroud having a disk portion extending along and oriented about a central axis of the rotary machine, a transition portion extending from the disk portion, and a flared portion extending axially from the transition portion.

15. The method of claim 14, wherein the additive manufacturing process is 3D printing.

16. The method of claim 15, wherein the step of impregnating comprises selectively printing the fibers to vary a fiber density in the plastic substrate.

17. The method of claim 16, wherein the step of impregnating comprises:
selectively printing fibers to form a region of increased fiber density adjacent to the portion of the outer surface of the plastic substrate to which the metal plating is applied; and/or
selectively printing fibers at an angle relative to the portion of the outer surface to which the metal plating is applied.

18. The method of 16, wherein the plastic of the plastic substrate has a third coefficient of thermal expansion, the third coefficient of thermal expansion greater than the first coefficient of thermal expansion of the fibers.

19. The method of 18, wherein the first coefficient of thermal expansion of the fibers is less than the second coefficient of thermal expansion of the metal plating.

20. The method of claim 19, wherein the fibers are selected from the group consisting of carbon, para-aramid, glass, metal, and combinations thereof.

* * * * *